United States Patent [19]

Strobl

[11] Patent Number: 5,326,178

[45] Date of Patent: Jul. 5, 1994

[54] ANGULARLY BIASSED SELF-ALIGNING BEARING

[75] Inventor: Gerorg Strobl, Stuttgart, Fed. Rep. of Germany

[73] Assignee: Johnson Electric S.A., Switzerland

[21] Appl. No.: 975,264

[22] Filed: Nov. 12, 1992

[30] Foreign Application Priority Data

Nov. 12, 1991 [GB] United Kingdom ............... 9124016

[51] Int. Cl.$^5$ ............................................ F16C 23/04
[52] U.S. Cl. ................................. 384/192; 384/204; 384/210
[58] Field of Search ............... 384/192, 210, 204, 203, 384/209, 208

[56] References Cited

U.S. PATENT DOCUMENTS

| | | | |
|---|---|---|---|
| 1,978,484 | 10/1934 | Aufiero | 384/204 |
| 4,380,860 | 4/1983 | Riester et al. | 384/203 |
| 4,806,025 | 2/1989 | Kamiyama et al. | 384/204 |
| 4,887,916 | 12/1989 | Adam et al. | 384/210 |

FOREIGN PATENT DOCUMENTS 2226090 11/1988 United Kingdom .

Primary Examiner—Lenard A. Footland
Attorney, Agent, or Firm—Ostrolenk, Faber, Gerb & Soffen

[57] ABSTRACT

An angularly biassed self-aligning bearing has a bearing member which is seated in a housing and held in place by a retainer which urges a first external, part-spherical, surface-of-revolution on the bearing member axially into engagement with an internal, part-spherical, surface-of-revolution formed in the housing. The retainer has first and second resilient retaining members which engage opposite sides of a transversely extending first portion of a second external surface-of-revolution on the bearing member. The first resilient retaining members exert greater loading on the bearing member than the second resilient retaining members so that the bearing member is tilted relative to the housing.

16 Claims, 3 Drawing Sheets

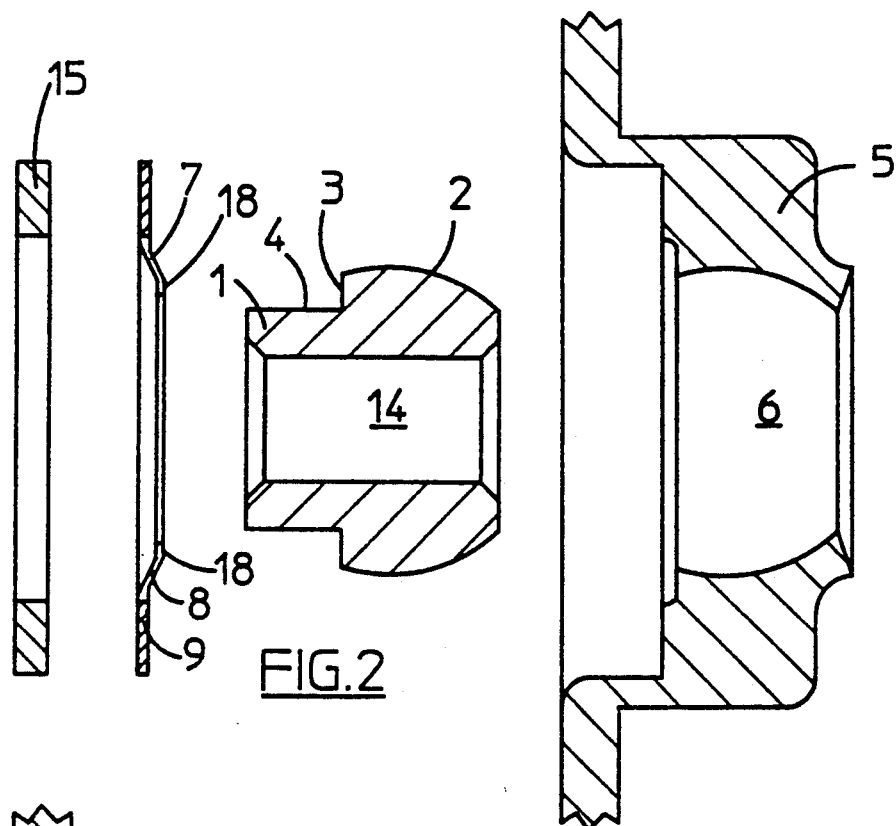
FIG. 2
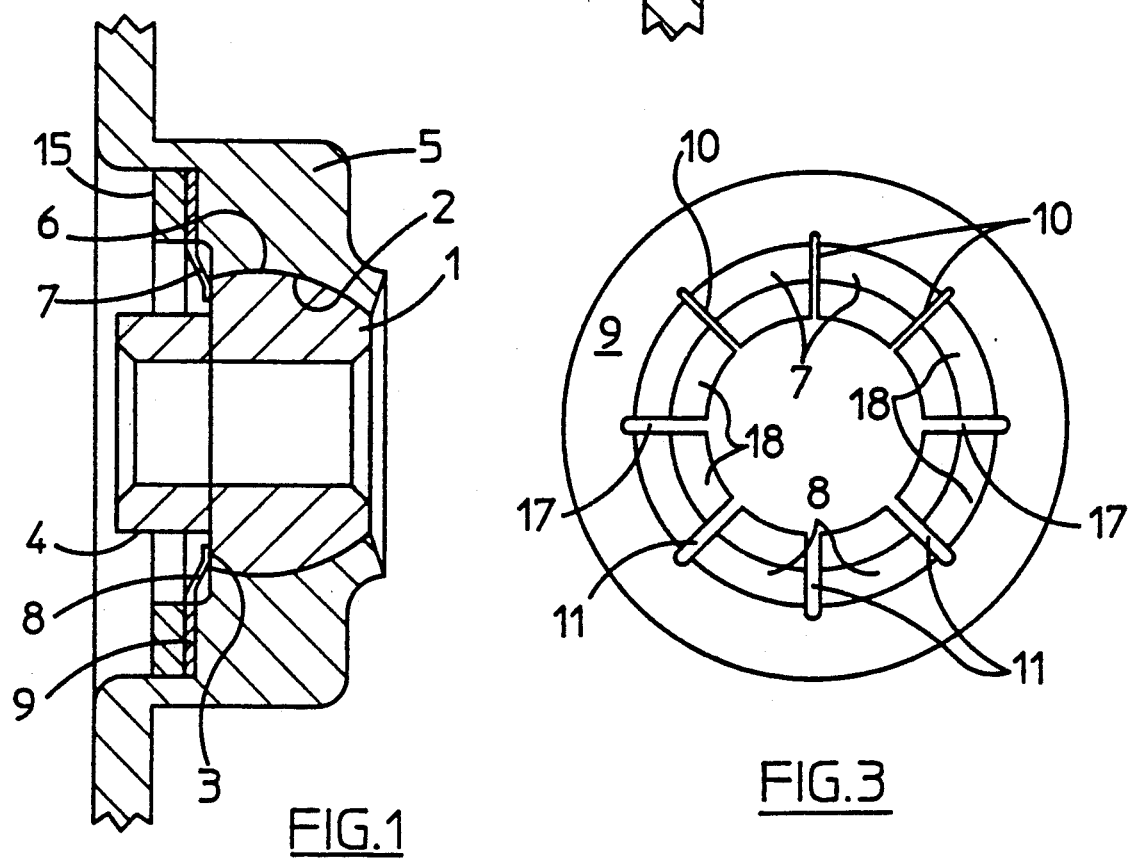
FIG. 1
FIG. 3

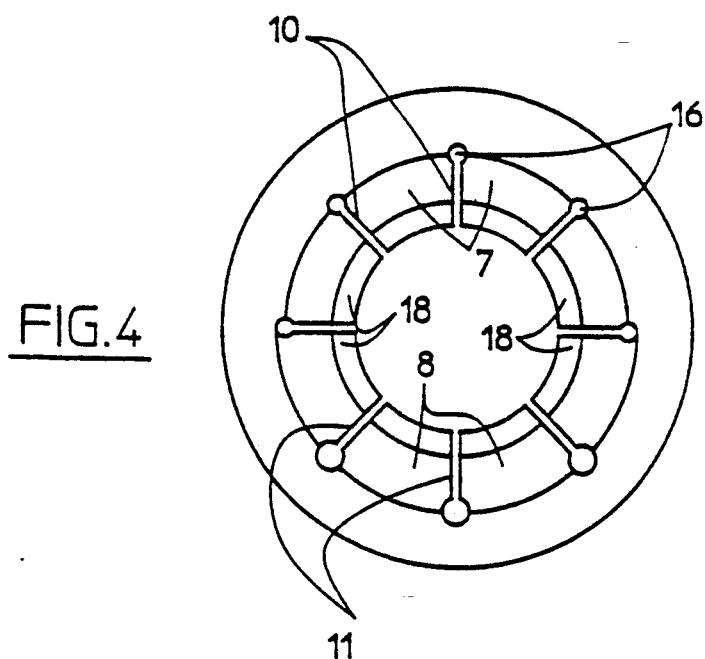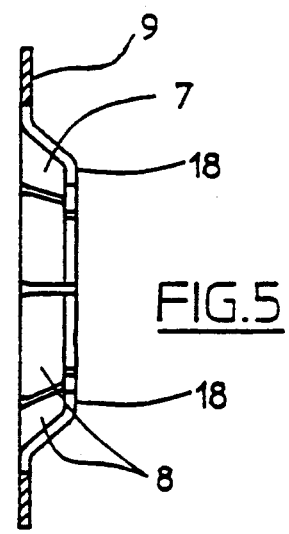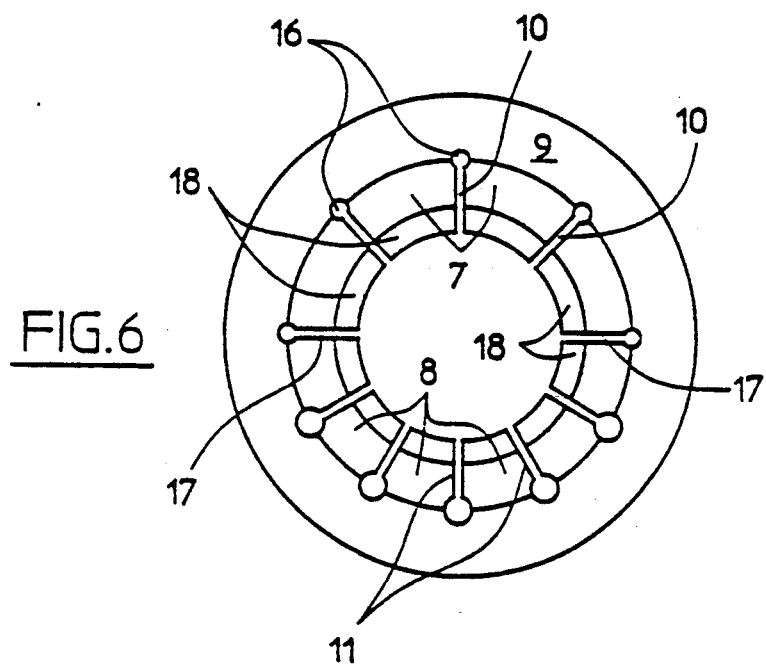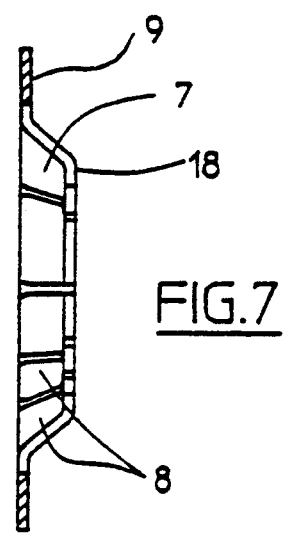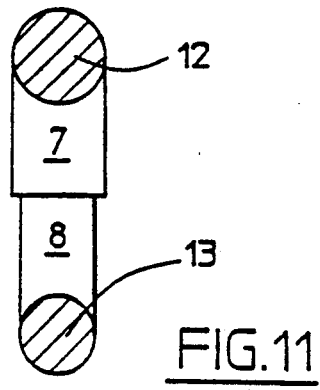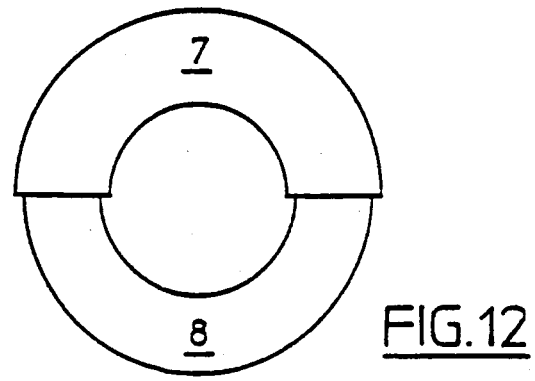

ANGULARLY BIASSED SELF-ALIGNING BEARING

FIELD OF THE INVENTION

The invention relates to an angularly biassed self-aligning bearing for small electric motors, for example, electric motors of up to 0.5 kW capacity.

BACKGROUND ART

In the manufacture of small electric motors, which are each fitted with a self-aligning bearing, it is difficult to reduce tolerances sufficiently to ensure that motors are not produced with too much clearance between the motor shaft and the bearing member of the self-aligning bearing. As a result, operation of these motors causes unacceptably high noise.

One way to overcome this difficulty is to resiliently bias the bearing member so that its axis is more steeply inclined to the axis of the bearing member housing than the motor shaft. This ensures that the bearing member is always inclined to the motor shaft so that the effective clearance between the motor shaft and the bearing member is effectively reduced and the noise produced on operation of the motor is also reduced.

In a known angularly blessed self-aligning bearing such as this, as disclosed in UK Patent Specification No. 2 226 090, a bearing member has an outer surface comprising first and second external surfaces formed around the axis of the bearing member; the first external surface is a part-spherical surface-of-revolution having a center of curvature lying on the axis of the bearing member; the second external surface is non-coincident with an imaginary spherical surface having the same center of curvature as the first external, part-spherical, surface-of-revolution and comprises at least one first portion which extends transversely of the axis of the bearing member; a housing for accommodating the bearing member has an internal surface-of-revolution, formed around the axis of the housing; first and second resilient retaining means are supported in engagement with the bearing member, with the second resilient retaining means engaging the second external surface; and the first and second resilient retaining means are resiliently distorted so as to urge the first external, part-spherical, surface-of-revolution axially into engagement with the internal surface-of-revolution, and to impose turning moments which tilt the bearing member by a predetermined amount relative to the housing.

In this construction, the second external surface comprises at least one first transversely extending portion which is the base of a notch formed in the first external, part-spherical, surface--of-revolution and the or each second resilient retaining means is a finger which differs in size and shape from the first resilient retaining means. Difficulty is therefore encountered in forming suitably accurate notches in the bearing member, which is usually of sintered construction, and in fitting the first and second resilient retaining means so that the fingers constituting the second resilient retaining means are correctly positioned in relation to the notches formed in the first external, part-spherical, surface-of-revolution.

DISCLOSURE OF INVENTION

The purpose of the present invention is to provide an angularly biassed self-aligning bearing in which the difficulty in the forming and assembling of known constructions is at least partly reduced.

This is achieved by ensuring that the second external surface is a second external surface-of-revolution formed around the axis of the bearing member and that both the first and second resilient retaining means engage a transversely extending first portion of the second external surface-of-revolution.

Thus, according to the invention, there is provided an angularly biassed self-aligning bearing in which a bearing member has an outer surface comprising first and second external surfaces-of-revolution formed around the axis of the bearing member; the first external surface-of-revolution is part-spherical, having a center of curvature lying on the axis of the bearing member; the second external surface-of-revolution is non-coincident with an imaginary spherical surface having the same center of curvature as the first external part-Spherical surface-of-revolution; and first and second resilient means are supported in engagement with a first transversely extending portion of the second external surface-of-revolution and resiliently distorted so as to urge the first external, part-spherical, surface-of-revolution axially into engagement with the internal surface-of-revolution and to impose turning moments which tilt the bearing member, about an axis perpendicular to the housing.

The turning moments imposed on the bearing member tilt the bearing member until the turning moments are reduced, by self-adjustment of the resilient loading, to a point where they balance the reactive turning moments acting on the bearing member as a result of frictional loading on the bearing member.

In a preferred embodiment of the invention, the first and second resilient bearing means respectively engage the transversely extending first portion of the second external surface-of-revolution on opposite sides of the axis of the bearing member so as to impose unequal, oppositely directed turning moments on the bearing member.

It is therefore the resultant of these oppositely directed turning moments which causes the bearing member to tilt.

Although turning moments depend both on the loading and the moment arm, it is preferred that the first resilient retaining means have greater resistance to resilient distortion than the second resilient retaining means.

This resistance to resilient distortion of the resilient retaining means may vary from a maximum to a minimum between first and second resilient retaining means respectively engaging the transversely extending first portion of the second external surface-of-revolution on opposite sides of the axis of the bearing member.

The second-external surface-of-revolution preferably comprises a second portion which extends longitudinally of the axis of the bearing member. This facilitates assembly in that the second portion of the second external surface-of-revolution provides a central body around with the resilient retaining means can be mounted.

Moreover, with this form of construction it is possible to arrange the first and second resilient retaining means respectively so that they engage with opposite sides of the longitudinally extending second portion of the second external surface-of-revolution so as to impose oppositely directed turning moments on the bearing member about an axis perpendicular to the axis of the housing.

In a preferred embodiment of the invention, the resilient retaining means form part of a retainer; the retainer has an outer ring portion; the retaining means comprise retaining members which extend radially inwards from the outer ring portion; and the first retaining members are separated by first radially extending slots and the second retaining members are separated by second radially extending slots. A retainer such as this can be easily produced by stamping from sheet spring material.

With retainers such as this, slots may be equiangularly disposed around the retainer and the first slots may be either narrower or shorter than the second slots. In both cases, the first retaining members, between the first slots, are stiffer and less easily deformed than the second resilient retaining members.

Alternatively, the angular spacing between first slots may be greater than the angular spacing between the second slots.

In a different form of construction, the first and second resilient retaining means respectively comprise first and second lengths of transversely compressed elastomeric material respectively extending half way around, and together extending all the way around, the second external surface-of-revolution. The compressible material may comprise rubber or similar plastic material.

The first length may be of less easily compressed material than the second length. Alternatively, the first and second lengths may have respective first and second uniform cross-sections and the first cross-section may be larger than the second cross-section so as to provide a difference in resistance to resilient distortion of the first and second resilient retaining means.

Where the resilient retaining means comprise first and second lengths of transversely compressed elastomeric material, the second external surface-of--revolution preferably comprises a second portion which extends longitudinally of the axis of the bearing member. This facilitates mounting of the lengths of elastomeric material in that they can be wrapped around this second portion. In this case, the first and second resilient retaining means respectively engage opposite sides of the longitudinally extending second portion of the second external surface-of-revolution so as to impose unequal oppositely directed turning moments on the bearing member about an axis perpendicular to the axis of the housing.

Clearly, whatever the form of resilient retaining means, axial loading of the bearing member, to urge the first external, part-spherical, surface-of-revolution into engagement with the internal surface-of-revolution formed in the housing, is facilitated if the transversely extending first portion of the second external surface-of-revolution preferably extends perpendicular to the axis of the bearing member.

Self-aligning bearings embodying the invention and incorporating several optional features are hereinafter described, by way of example, with reference to the accompanying drawings.

BRIEF DESCRIPTION OF THE DRAWINGS

FIG. 1 is a schematic sectional side elevation of a first embodiment of the invention;

FIG. 2 is an exploded sectional view of the self-aligning bearing shown in FIG. 1;

FIG. 3 is an end elevational view of a resilient retainer forming part of the bearing shown in FIGS. 1 and 2;

FIGS. 4 and 5 are end and side elevations of a second resilient retainer similar to the retainer shown in FIG. 3;

FIGS. 6 and 7 are end and side elevations of a third resilient retainer similar to the retainer shown in FIG. 3;

FIGS. 11 and 12 are side an end elevations of second resilient retainer means similar to the retainer means shown in FIG. 10.

BEST MODES FOR CARRYING-OUT THE INVENTION

Figure 9:
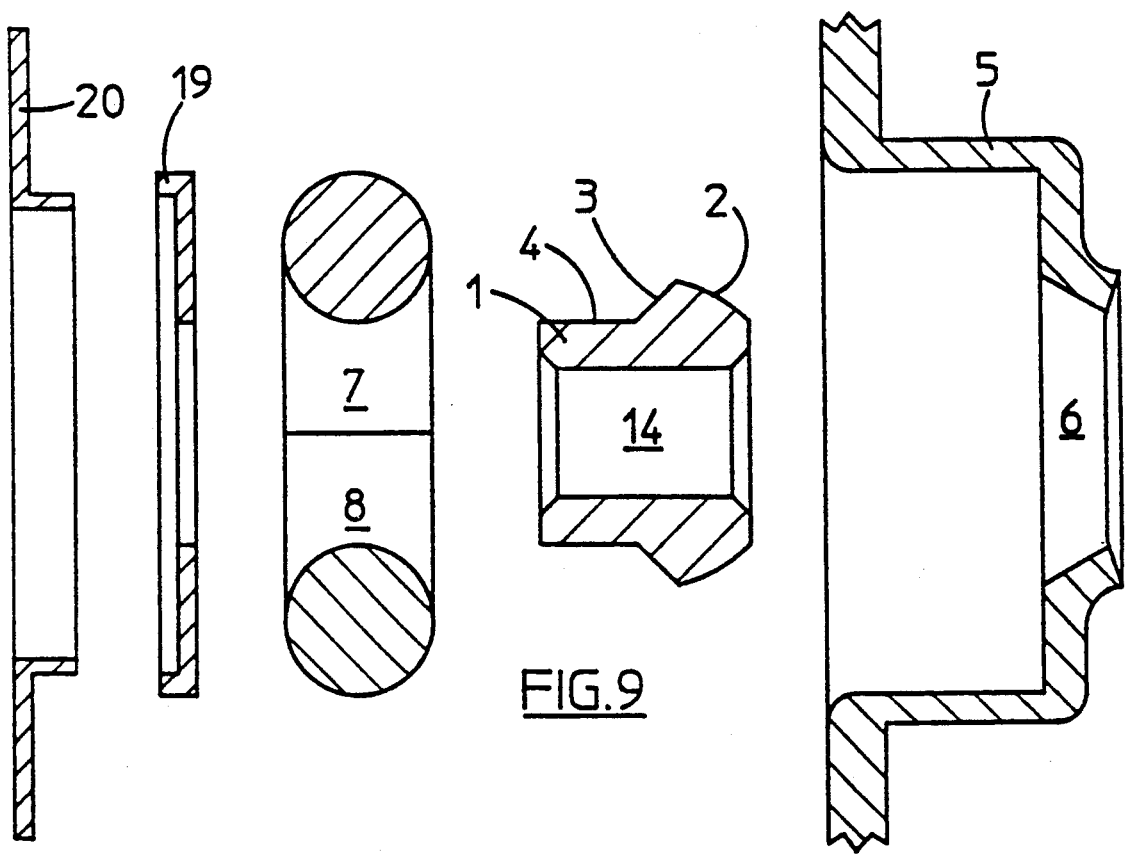
FIGS. 8 and 9 are a sectional side elevation and an exploded sectional view, similar to FIGS. 1 and 2, of a second embodiment of the invention.

As shown in FIGS. 1 and 2, the first embodiment of the invention includes a bearing member 1 having a cylindrical inner surface 14 for receiving a rotatable shaft, and an outer surface 3, 4, 5 comprising first and second external surfaces-of-revolution 2 and 3, 4 formed around the axis of the bearing member 1. As shown, the first external surface-of-revolution 2 is part-spherical and the second external surface-of-revolution 3, 4 consists of a first, transversely extending annular portion 3 and a second, longitudinally extending cylindrical portion 4. A housing 5 accommodating the bearing member 1 has an internal, part-spherical, surface-of-revolution 6 formed around the axis of the housing 5. The bearing member 1 is held within the housing 5 by a resilient retainer 7, 8, 9 which engages the first, annular portion 3 of the second external surface-of-revolution 3, 4 and is held in place by a locking ring 15 which is secured to the housing 5 by conventional means, such as screws (not shown).

The resilient retainer 7, 8, 9 is formed from an annular blank of spring steel sheet and comprises first and second resilient retaining members 7 and 8 which extend radially inwards from an annular outer ring 9, as shown more clearly in FIG. 3. To form the resilient retaining members 7 and 8, the blank is formed with a plurality of small and large apertures equiangularly spaced around a pitch circle which is co-axial with the inner and outer edges of an annular blank. The blank is also pressed to form an inner, annular rim and a frusto-conical region between the outer ring 9 and the inner annular rim. First and second slots 10 and 11 having the same widths as the small and large apertures are cut between the apertures and the inner edge of the blank to form the resilient retaining members 7 and 8. As shown, the first slots 10 are narrower than the second slots 11 and so the first retaining members 7, between the adjacent pairs of first slots 10, are stiffer than the second retaining members 8, between the adjacent pairs of second slots 11. Diametrically opposite composite slots 17, which each have a width between that of the first and second slots 10 and 11, each separate a first resilient retainer member 7 on one side of the retainer from a second resilient retainer member 8 on the other side of the retainer.

The slots 10 and 11 divide the inner annular rim of the blank into a plurality of pads 18 which are resiliently pressed against the first, annular portion 3 of the second external surface-of-revolution 3, 4 so as to urge the first external, part-spherical, surface-of-revolution 2 of the bearing member 1 axially into contact with the internal, part-spherical, surface-of-revolution 6 formed in the housing 5.

At the same time, because the first resilient retaining members 7 are stiffer than the second resilient retainer members 8, there is a resultant turning moment acting on the bearing member 1 causing the bearing member 1 to tilt, in the clockwise direction as shown in FIG. 1. Although not shown in FIG. 1, for the sake of clarity, the bearing member is tilted by a predetermined amount into a position in which the resilient turning moment imposed on the bearing member 1 is balanced by reactive turning moments resulting from frictional forces, principally between the external and internal part-spherical surfaces-of-revolution 2 and 6, acting on the bearing member 1.

In modifications of the embodiment shown in FIGS. 1 and 2, the retainer shown in FIG. 3 is replaced by a retainer as shown in FIGS. 4 and 5 or by a retainer as shown in FIGS. 6 and 7.

The retainer shown in FIGS. 4 and 5 differs from the retainer shown in FIG. 3 in that, although the first and second slots 10 and 11 between the resilient retaining members 7 and 8 are equiangularly disposed around the retainer, the first slots 10 are shorter than the second slots 11 so that the first retaining members 7 are, once again, stiffer and more resistance to resilient distortion than the second retaining members 8. In this case, apertures 16 initially formed in the annular blank from which the retainer is made are the same size, but formed on pitch semi-circles of difference radius so that the outer ring portion 9 of the retainer is not strictly annular in shape.

In the retainer shown in FIGS. 6 and 7, all the initial apertures 16 are formed on the same pitch circle and all the first and second slots 10 and 11 are of equal width, as in the retainer shown in FIG. 4, but in this case the second slots 11 and the apertures 16 in the lower part of the retainer are more closely spaced than the first slots 10 and the apertures 16 in the upper part. This means that the first retaining members 7, between each adjacent pair of first slots 10 are wider and therefore stiffer than the second retaining members 8.

Figure 8:
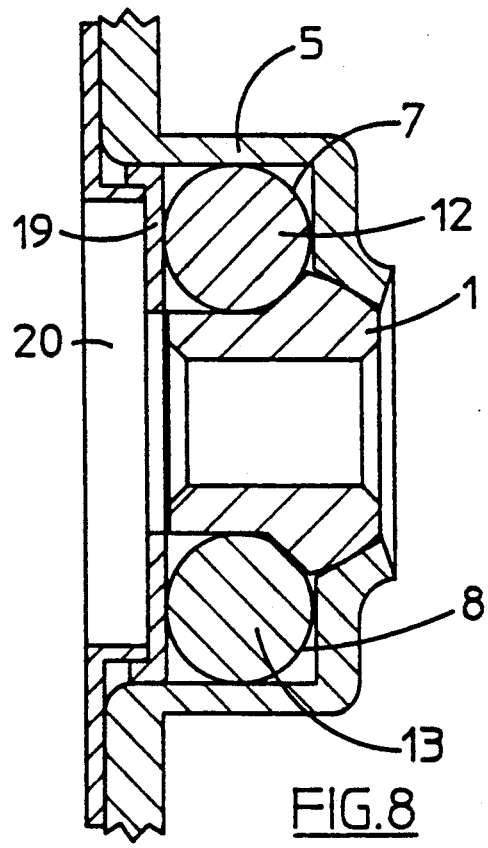
Figure 10:
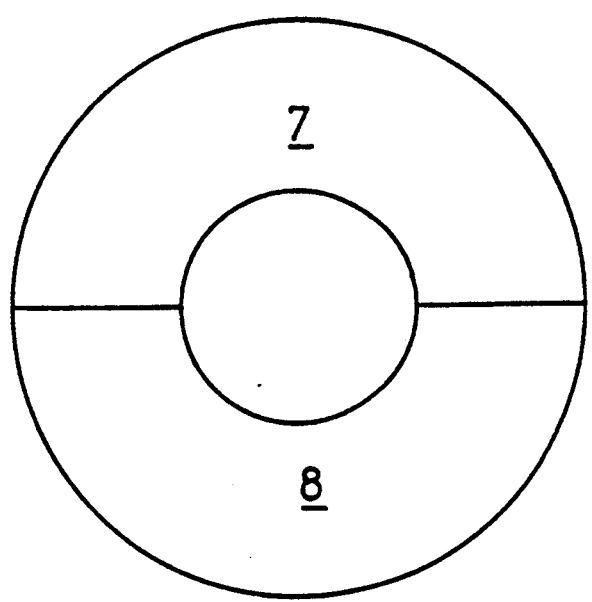
FIG. 10 is an end elevation of resilient retainer means forming parts of the bearing shown in FIGS. 8 and 9.

As shown in FIGS. 8 and 9, the second embodiment of the invention differs from the first embodiment in that the bearing member 1 has an outer surface 2, 3, 4 in which the first transversely extending portion 3 of the second external surface-of-revolution 3, 4 is frusto-conical in shape, the internal surface-of-revolution 6 formed in the housing 5 to receive the first external, part-spherical, surface-of-revolution formed on the bearing member 1, is frusto-conical in shape and the first and second resilient retaining means 7 and 8 comprise two circular section pieces of rubber which each extend half-way around the bearing member 1. As also shown, the resilient retaining means 7 and 8 are held between the bearing member 1, the housing 5 and a support ring 19 which is held in place by a locking ring 20 which is fastened to the housing 5 by conventional means such as screws (not shown).

Although the cross-sections 12 and 13 of the first and second resilient retaining means 7 and 8 have been shown as circular in FIG. 8, these cross-sections will be distorted as a result of compressive loading so that both will apply different axial and radial loading on the bearing member 1. This is achieved by forming the two resilient retaining means 7 and 8 from different rubber so that the first resilient retaining means 7 are formed from rubber which presents greater resistance to compressive deformation than the rubber from which the second resilient retaining means are formed.

The radial and axial loading on the bearing member 1 can be controlled by the dimensions of the assembly and the extent of compressive deformation to which the resilient retaining means are subjected so as to ensure that the bearing member 1 is tilted relative to the housing 5 and the axis of the bearing member 1 is inclined to the axis of the housing 5. In practice, this inclination should be greater than the anticipated maximum inclination between the axis of the motor shaft and the axis of the housing 5. As this anticipated maximum inclination is of the order of one degree (1°), it would be appropriate to provide sufficient resilient loading on the bearing member 1 to rotate it two degrees (2°) relative to the housing 5.

In an alternative construction, resilient retaining means 7 and 8 having identical cross-sections 12 and 13, as shown schematically in FIG. 8, are replaced by first and second resilient means 7 and 8 as shown, schematically, in FIGS. 11 and 12. In this case, the cross-section 12 of the first resilient retaining means 7 is greater than the cross-section 13 of the second resilient means 8 and both resilient retaining means 7 and 8 are formed from the same rubber material.

The scope of the invention is set out in the appended claims. Although these claims include reference numerals, this is solely for ease of understanding and these reference numerals are not to be regarded as limiting the scope of the claims. The reference numerals should therefore be disregarded in interpreting the scope of the claims.

What is claimed is:

1. An angularly biassed self-aligning bearing comprising:
    a bearing member with an outer surface having first and second external surfaces formed around the axis of the bearing member in which:
        the first external surface is a part-spherical surface-of-revolution having a center of curvature lying on the axis of the bearing member; and
        the second external surface is a second surface-of-revolution formed around the axis of the bearing member, is non-coincident with all imaginary spherical surfaces having the same center of curvature as the first external part-spherical surface-of-revolution and comprises at least one first portion which extends transversely of the axis of the bearing member;
    a housing, for accommodating the bearing member, having an internal surface-of-revolution, formed around the axis of the housing; and
    first and second resilient retaining means supported in engagement with the transversely extending first portion of the second external surface-of-revolution and resiliently distorted so as to urge the first external part-spherical surface-of-revolution axially into engagement with the internal surface-of-revolution and to impose turning moments which tilt the bearing member by a predetermined amount relative to the housing about an axis perpendicular to the axis of the housing.

2. A bearing, according to claim 1, in which the first)and second resilient retaining means respectively engage the transversely extending first portion of the second external surface-of-revolution on opposite sides of the axis of the bearing member so as to impose unequal, oppositely directed, turning moments on the bearing member.

3. A bearing, according to claim 2, in which the first resilient retaining means have greater resistance to resilient distortion than the second resilient retaining means.

4. A bearing, according to claim 3, in which the resistance to resilient distortion of the resilient retaining means varies from a maximum to a minimum between first and second resilient retaining means respectively engaging the transversely extending first portion of the second external surface-of-revolution on opposite sides of the axis of the bearing member.

5. A bearing, according to claim 3 further comprising:
- a retainer having an outer ring portion and incorporating the first and second retaining means in the form of first and second retaining members which extend radially inwards from the outer ring portion; and
- the first retaining members are separated by first radially extending slots and the second retaining members are separated by second radially extending slots.

6. A bearing, according to claim 5, in which:
the slots are equiangularly disposed around the retainer; and
the first slots are narrower than the second slots.

7. A bearing, according to claim 5, in which:
the slots are equiangularly disposed around the retainer; and
the first slots are narrower than the second slots.

8. A bearing, according to claim 5, in which:
the angular spacing between first slots is greater than the angular spacing between the second slots.

9. A bearing, according to claim 2, in which the second external surface-of-revolution comprises a second portion which extends longitudinally of the axis of the bearing member.

10. A bearing, according to claim 7, in which the first and second resilient retaining means respectively engage opposite sides of the longitudinally extending second portion of the second external surface-of-revolution so as to impose oppositely directed turning moments on the bearing member about an axis perpendicular to the axis of the housing.

11. A bearing, according to claim 1, in which the transversely extending first portion of the second external surface-of-revolution extends perpendicular to the axis of the bearing member.

12. A bearing, according to claim 1, in which the first and second resilient retaining means respectively comprise first and second lengths of transversely compressed elastomeric material respectively extending half way around, and together extending all the way around, the second external surface-of-revolution.

13. A bearing, according to claim 12, in which the first length is of less easily compressed material than the second length.

14. A bearing, according to claim 12, in which:
the first and second lengths have respective first and second uniform cross-sections; and
the first cross-section is larger than the second cross-section.

15. A bearing, according to claim 12, in which the second external surface-of-revolution comprises a second portion which extend longitudinally of the axis of the bearing member.

16. A bearing, according to claim 15, in which the first and second resilient retaining means respectively engage opposite sides of the longitudinally extending second portion of the second external surface-of-revolution so as to impose unequal oppositely directed turning moments on the bearing member about an axis perpendicular to the axis of the housing.

* * * * *

UNITED STATES PATENT AND TRADEMARK OFFICE
CERTIFICATE OF CORRECTION

PATENT NO. : 5,326,178
DATED : July 5, 1994
INVENTOR(S) : Georg STROBL

It is certified that error appears in the above-indentified patent and that said Letters Patent is hereby corrected as shown below:

On the title page of the above-identified patent, at item

[75] Inventor, "Gerorg" should read --Georg--.

Signed and Sealed this

Thirteenth Day of September, 1994

Attest:

BRUCE LEHMAN

Attesting Officer     *Commissioner of Patents and Trademarks*